US012694135B2

(12) United States Patent
Yeo et al.

(10) Patent No.: US 12,694,135 B2
(45) Date of Patent: Jul. 28, 2026

(54) THIRD-PARTY PRIVATE SET INTERSECTION WITH COMMUNICATION AND COMPUTATIONAL EFFICIENCY

(71) Applicant: Seagate Technology LLC, Fremont, CA (US)

(72) Inventors: Foo Yee Yeo, Shugart (SG); Jason Hwei Ming Ying, Shugart (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 136 days.

(21) Appl. No.: 18/619,098

(22) Filed: Mar. 27, 2024

(65) Prior Publication Data

US 2024/0330485 A1    Oct. 3, 2024

Related U.S. Application Data

(60) Provisional application No. 63/586,488, filed on Sep. 29, 2023, provisional application No. 63/492,721, filed on Mar. 28, 2023.

(51) Int. Cl.
G06F 21/60 (2013.01)
H04L 9/30 (2006.01)

(52) U.S. Cl.
CPC .......... G06F 21/602 (2013.01); H04L 9/3093 (2013.01); H04L 2209/46 (2013.01); H04L 2209/50 (2013.01)

(58) Field of Classification Search
CPC .................................................. G06F 21/602
See application file for complete search history.

(56) References Cited

U.S. PATENT DOCUMENTS

| | | | | |
|---|---|---|---|---|
| 9,846,785 B2 * | 12/2017 | Bacon | ..................... | H04L 9/008 |
| 10,885,203 B2 * | 1/2021 | Li | .......................... | G06F 21/602 |
| 11,070,366 B2 * | 7/2021 | Soriente | ................ | H04L 9/3226 |
| 11,128,454 B2 * | 9/2021 | Kim | ..................... | H04L 9/0852 |
| 12,418,405 B2 * | 9/2025 | Peddada | ............... | H04L 9/3263 |

OTHER PUBLICATIONS

Baldi, Pierre , et al., "Countering GATTACA: efficient and secure testing of fully-sequenced human genomes", Proceedings of the 18th ACM conference on Computer and communications security (CCS'11), ACM, 2011, 691-702.

Cantor, David G., et al., "A New Algorithm for Factoring Polynomials Over Finite Fields", Mathematics of Computation, American Mathematical Society, No. 154, vol. 36, 1981, 587-592.

Chernoff, Herman , "A measure of asymptotic efficiency for tests of a hypothesis based on the sum of observations", The Annals of Mathematical Statistics, 23(4)., 1952, 493-507.

Duong, Thai , et al., "Catalic: delegated psi cardi- nality with applications to contact tracing", International Conference on the Theory and Application of Cryptology and Information Security (ASI-ACRYPT 2020), Springer, 2020, 879-899.

Freedman, Michael J., et al., "Efficient Private Matching and Set Intersection", Advances in Cryptology—EUROCRYPT 2004; Springer, Berlin, Heidelberg, 2004, 1-19.

Hallgren, Per , et al., "Privatepool: Privacy- preserving ridesharing", 2017 IEEE 30th Computer Security Foundations Symposium (CSF), 2017, 276-291.

Horowitz, Ellis , "A fast method for interpolation using preconditioning", Information Processing Letters, 1972, 157-163.

Huberman, Bernardo A., et al., "Enhancing privacy and trust in electronic communities.", Proceedings of the 1999 Acm Conference on Electronic Commerce, 1999.

Ion, Mihaela , et al., "On deploying secure computing: Private intersection-sum-with-cardinality", 2020 IEEE European Symposium on Security and Privacy (EuroS&P), IEEE, 2020, 370-389.

Kamara, Seny , et al., "Scaling private set intersection to billion-element sets", International conference on financial cryptography and data security; Springer, Berlin, Heidelberg, 2014, 195-215.

Kolesnikov, Vladimir , et al., "Efficient batched oblivious PRF with applications to private set intersection", Proceedings of the 2016 ACM SIGSAC Conference on Computer and Communications Security (CCS'16), ACM, 2016, 818-829.

Le, Phi Hung, et al., "Two-party private set intersection with an untrusted third party", Proceedings of the 2019 ACM SIGSAC Conference on Computer and Communications Security (CCS'19), ACM, 2019, 2403-2420.

Meadows, Catherine , "A more efficient cryptographic matchmaking protocol for use in the absence of a continuously available third party", Proceedings of the 1986 IEEE Symposium on Security and Privacy, IEEE, 1986, 134-134.

Nagaraja, Shishir , et al., "Finding P2P bots with structured graph analysis", 19th USENIX Security Symposium (USENIX Security 10), 2010, 95-110.

Narayanan, Arvind , et al., "Location privacy via private proximity testing", Network and Distributed Security Symposium (NDSS'11). The Internet Society, 2011.

(Continued)

*Primary Examiner* — Simon P Kanaan

(74) *Attorney, Agent, or Firm* — HOLZER PATEL DRENNAN

(57) ABSTRACT

A private set intersection protocol in which a third party may determine intersections of a first set of a first party and a second set of a second party. The third party may not obtain any information regarding the first set or the second set other than the intersection result. The protocol may be communicatively efficient and computationally efficient to allow for secure private set intersection to be performed.

18 Claims, No Drawings

(56)          References Cited

OTHER PUBLICATIONS

Pinkas, Benny , et al., "Phasing: Private set intersection using permutation-based hashing", 24th USENIX Security Symposium (USENIX Security 15), 2015, 515-530.

Raghuraman, Srinivasan , et al., "Blazing fast PSI from improved OKVS and subfield vole", ACM CCS'21, Oct. 4, 22, 2021.

Rosulek, Mike , et al., "Compact and malicious private set intersection for small sets", Proceedings of the 2021 ACM SIGSAC Conference on Computer and Communications Security (CCS'21), ACM, 2021, 1166-1181.

Shamir, Adi , "On the power of commutativity in cryptography", Proceedings of the 1980 International Colloquium on Automata, Languages, and Programming, Springer, Heidelberg, 1980, 582-595.

* cited by examiner

THIRD-PARTY PRIVATE SET INTERSECTION WITH COMMUNICATION AND COMPUTATIONAL EFFICIENCY

CROSS REFERENCE TO RELATED APPLICATIONS

This application claims benefit of U.S. Provisional App. No. 63/492,721 filed on Mar. 28, 2023, entitled "THIRD-PARTY PRIVATE SET INTERSECTION" and claims benefit of U.S. Provisional App. No. 63/586,488 filed on Sep. 29, 2023, entitled "COMMUNICATION AND COMPUTATIONALLY EFFICIENT THIRD-PARTY PRIVATE SET INTERSECTION SCHEME," the entirety of each of the foregoing being incorporated by reference herein.

BACKGROUND

Private set intersection (PSI) enables the secure computation of the intersection of datasets held by two different parties. While this is a special case of secure multi-party computation, PSI protocols are, in general, much more efficient, thus allowing for practical applications on much larger datasets. While conventional two-party PSI has seen many diverse applications, the two-party PSI has traditionally been performed between the two parties holding the data set.

SUMMARY

In some aspects, the techniques described herein relate to a method for determining a private set intersection of respective sets of a first party and a second party by a third party, including: receiving, at the third party, first information regarding a first key set generated by the first party using a key agreement protocol between the first party and the second party, the first key set including encoded keys for elements of a first set of the first party; receiving, at the third party, second information regarding a second key set generated by the second party using the key agreement protocol between the first party and the second party, the second key set including encoded keys for elements of a second set of the second party; and calculating, at the third party, solutions to an equation based on the first information and the second information, the solutions to the equation correspond to common elements of the respective sets of the first party and the second party, wherein the third party obtains no other information regarding the first set or the second set, and wherein the first party and the second party do not obtain information regarding the common elements of the respective sets during the determining the private set intersection by the third party or any information regarding the elements of a set of another participating party during the determining the private set intersection.

In some aspects, the techniques described herein relate to a method for providing a communication to a third party for use in determining a private set intersection between respective sets of a first party and a second party, including: generating, at a first party having a first set, a first message using a key agreement protocol based on a first random value selected from a space of randomness; sending the first message to a second party having a second set; receiving, at the first party from the second party, a unique polynomial function that interpolates a plurality of second messages generated for elements of the second set by the second party based on the first message and respective second random values from the space of randomness; computing first information regarding a first key set generated by the first party using the unique polynomial function, the first key set including encoded keys for elements of the first set of the first party; and sending the first information to the third party.

In some aspects, the techniques described herein relate to a method for providing a communication to a third party for use in determining a private set intersection between respective sets of a first party and a second party, including: receiving, at a second party having a second set from a first party having a first set, a first message generated by the first party using a key agreement protocol based on a first random value from a space of randomness; determining, for elements of the second set, respective second messages based on corresponding second random values from the space of randomness and the first message; computing a first unique polynomial function that interpolates the second messages; sending the unique polynomial function to the first party for use in generating first information regarding a key set of the first party; generating second information regarding a second key set at the second party, the second key set including encoded keys for elements of the second set; and sending the second information to the third party.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

While the disclosure is susceptible to various modifications and alternative forms, specific examples thereof have been described by way of example herein. It should be understood, however, that it is not intended to limit the disclosure to the particular form disclosed, but rather, the disclosure is to cover all modifications, equivalents, and alternatives falling within the scope defined by the claims.

Traditional two-party private set intersection (PSI) schemes enable the secure computation of the intersection of datasets (also referred to herein simply as sets) held by different parties. In one special case of secure multi-party computation, the sets may be held by two parties, who coordinate between themselves to determine the intersection of the respective datasets held by each party. Such two-party PSI protocols may, in general, be relatively efficient, thus allowing for practical applications on relatively large datasets. In this regard, conventional two-party PSI has seen many diverse applications, such as botnet detection, human genome testing, private proximity testing, online advertising, privacy-preserving ride-sharing, contact tracing, and other potential applications.

While two-party PSI schemes have been proposed, a related set intersection problem is one in which the intersection output in the PSI scheme is to be revealed only to an inputless third party. While such a third-party variant of the PSI problem has many applications, there has not been a solution to this problem so far. Moreover, there has been an increasing number of scenarios whereby an inputless third party desires the output of an intersection between datasets held by two other parties. Privacy considerations may be such that only the third party obtains the intersection output and receives no other information of the input sets of either party. Moreover, it may be desirable that no information is revealed to either of the participating parties in the process.

For example, during a pandemic, people frequent various venues such as malls, supermarkets, and places of worship. These premises may keep an identity record of people who visit, along with their times of entry and exit, for the purpose of contact tracing. In the event of a virus cluster at two or more of these locations, a regulatory organization may then be able to obtain the identities of the people who are present at specific times at all these premises to identify potential asymptomatic sources of the clusters in a privacy-preserving manner. Another such scenario involves finding the sets of patients common to two hospitals to perform a research study. Such a study may often be carried out by a third party, such as a researcher in a university or another organization. In this situation, it may be desirable for the researcher to be the only party who finds out the intersection of the private data sets provided, where neither source of data receives information about the result.

While the above situations occur often, there has been no solution to such a problem in which two parties holding respective datasets wish to allow a third party to determine intersections in the datasets. Moreover, it is desirable that in such a third-party PSI scheme, the inputless third party should not receive information regarding either dataset other than the intersections thereof. Hence, in this disclosure, a variant of PSI is described that may facilitate a scheme for PSI by a third party with the characteristics noted as beneficial above in which only the third party receives the result of the PSI and neither participating party receives information regarding the dataset of the other party.

Two considerations may be balanced when considering the efficiency of a third-party PSI protocol: computational cost and communication overhead. Due to advances in hardware that bring to bear improvements in computational capacity and efficiency, communication overhead has gradually been presented as a larger bottleneck than computational cost. For example, communication costs typically far outweigh computation, especially in business settings, as it may be much less expensive to add processing resources than to expand network capacity. Hence, these protocols described herein may provide communication cost as the primary consideration. Accordingly, the present disclosure may optimize (e.g., reduce) communication overhead by utilization of computational resources. Additionally, the present disclosure presents an example protocol that may be used to reduce computational costs for a third party performing computations in the PSI. Such a protocol may be particularly beneficial for very large sets.

The protocols described herein may also achieve security against semi-honest adversaries. Furthermore, the protocols may reduce communications to approximately three times the number of instances in a set (e.g., 3n, where n is the number of items in each party's dataset). The reduction of communications to approximately 3n is almost optimal, as it may be shown that any such protocol must require at least 2n communications. In this regard, it might be the case that a protocol that uses only 2n communication can never be realized in reality, such that 3n communications may represent an ideal scenario, which the present protocol approaches for communications efficiency.

Accordingly, a PSI scheme described in the present disclosure may facilitate a number of advantages, including privately computing the intersection of two datasets held by two different parties while revealing the result only to a third party and optimizing the amount of communication needed to achieve the PSI. In addition, a PSI scheme as presented herein may allow near linear scaling of computational resources used by a first party ($P_1$) having a first set ($S_1$) and a second party ($P_2$) having a second set ($S_2$), with computational resources scaling almost linearly with the number of instances in the sets (n). In this regard, a protocol according to the present disclosure is practical with large datasets, even when $P_1$ and $P_2$ have limited computational power. In addition, the protocol may be relatively easy to implement as the protocol is based on well-understood cryptographic primitives, namely key exchange algorithms, for which there are many options that may be implemented depending on the security and performance requirements. For example, the protocol may utilize either Diffie-Hellman or post-quantum key agreement algorithms such as CRYSTALS-Kyber. In this latter regard, a PSI protocol, as described herein, may itself be quantum-safe through the use of quantum-safe key agreement protocols.

Furthermore, an optional approach described in the present disclosure may further alleviate the computational requirements for a third party (Q) that performs the PSI calculations. Specifically, this approach may include the hashing of the parties' datasets into a plurality of separate sets of elements to be used in multiple rounds in which the PSI protocol described herein is performed on each separate set of elements. Reference herein will be made to these separate sets of elements as "buckets" as shorthand. In this regard, each party of the PSI scheme may hash their elements into buckets that are also each populated with dummy elements. In this regard, while additional rounds of key agreement exchanges may be utilized for each of the plurality of buckets created by the parties, the computational demand by the third party may be reduced within each specific PSI performed in relation to the buckets of the separate parties.

While additional details of the PSI scheme are discussed below, the present approach generally combines a key agreement protocol performed between two parties that then provides information regarding key encoded values of elements of the datasets to a third party. That is, the key agreement protocol may be used by the two parties to achieve an agreement relative to cryptographically transforming the elements of a dataset. As such, identical elements in the intersection of the parties' datasets may be the same when the cryptographic transformation is applied using the keys generated from the agreed upon key agreement protocol. In addition, one or both of the parties may provide information regarding a key set corresponding to the cryptographically transformed elements to the third party as interpolated values in a polynomial function. This may thus allow for information regarding the key set of one or both of the parties to be further obfuscated or hidden so as to avoid providing information regarding the datasets of either party to the third party or the other party. Moreover, through the use of such polynomial interpolation, the third party may use straightforward polynomial factorization or root-finding algorithms to arrive at the common elements of the datasets of the respective parties. For example, the third party may establish an equation using the information provided by the parties (e.g., including one or more polynomial functions interpolating key sets of the parties) in performing the polynomial evaluation.

As such, while any key agreement protocol may be used by the first party $P_1$ and second party $P_2$ in an example of the PSI protocol described herein, a key exchange protocol or Text use key agreement protocol may be used that is described as:

1. $P_1$ picks $a \leftarrow KA.\mathcal{R}$, and sends $m_1 = KA.msg_1(a)$ to $P_2$.
2. $P_2$ picks $b \leftarrow KA.\mathcal{R}$, and sends $m_2 = KA.msg_2(b, m_1)$ to $P_1$.
3. $P_1$ and $P_2$ output $KA.key_1(a, m_2)$ and $KA.key_2(b, m_1)$ respectively.

Turning to a first example of a PSI protocol, suppose two parties, $P_1$ and $P_2$ have respective sets $S_1$ and $S_2$. That is a first party $P_1$ may have a first dataset $S_1$, and a second party $P_2$ may have a second dataset $S_2$. The respective sets may be subsets of a finite field of a given size defined by a field parameter $\ell$. That is, $S_1, S_2 \subseteq \{0,1\}^{\ell}$. The size of the field may be defined in relation to the field parameter $\ell$ and a security and correctness parameter $\lambda$ such that the field may be characterized as $|\mathbb{F}| \geq 2^{\ell + \lambda + 2\log n}$. In this regard, the security and correctness parameter $\lambda$ may be selected to provide a sufficiently large field and thus provide sufficient randomness, such that false identifications of intersections may be reduced below a suitable level.

For definitional purposes, the first set $S_1$ may have n instances or values as indicated by $S_1 = \{s_1, \ldots, s_n\}$ and the second set $S_2$ may have n number of instances or values such that $S_2 = \{t_1, \ldots, t_n\}$. A key agreement protocol KA may be selected. For example, a 2-round key agreement protocol may be selected, such as the one outlined above. The key agreement protocol KA may have a space of randomness $KA.\mathcal{R}$. The key agreement protocol may also have a message space that is defined as the field described above as $KA.\mathcal{M} = \mathbb{F}$. The key agreement protocol may also have a key space that is defined as the field described above as $KA.\mathcal{K} = \mathbb{F}$. Also, an ideal permutation may be fixed, where a permutation is a bijective function on the field $\mathbb{F}$. The ideal permutation $\Pi$ may be a permutation chosen randomly from all available permutations such that $\Pi: \mathbb{F} \to \mathbb{F}$.

In the present protocol, the first party selects a first random value a belonging to the space of randomness $KA.\mathcal{R}$. That is, $P_1$ picks a random $a \in KA.\mathcal{R}$. The first party generates a first message m using the key agreement protocol based on the first random value. That is, $P_1$ generates $m = KA.msg_1(a)$. The first party sends the first message to the second party.

For each instance of the second data set (e.g., for each $i \in [n]$), the second party selects a corresponding second random value $b_i$ belonging to the space of randomness $KA.\mathcal{R}$. That is, the second random value for each element of the second set of the second party is a member of the space of randomness or $b_i \in KA.\mathcal{R}$. In turn, the second party generates a second message for each instance of the second set using the key agreement protocol based on the first message and a corresponding second random value ($m_i = KA.msg_2(b_i, m)$). The second party also generates encoding function for each instance of the set using an inverse of an ideal permutation for each of the second messages or $f_i = \Pi^{-1}(m_i)$.

The second party may then compute a unique polynomial function p. The unique polynomial function p may be used to interpolate the messages generated for each instance of the second set. The first unique polynomial may be of one fewer degree than or equal to a degree fewer than the number of instances in the sets (e.g., p is of degree $\leq n-1$). The unique polynomial may encode the instances of the second set in that the first polynomial with an input of any of the instances of the second set is equal to a corresponding one of the encoding function. That is, the first unique polynomial is computed such that $p(t_i) = f_i$ for all $i \in [n]$. In turn, the second party sends the unique polynomial p to the first party.

In turn, the first party may compute a first key value for each instance of the first set. That is, for each $i \in [n]$, the first party computes a key value $k_i$. The key value $k_i$ for each instance of the first set may define a key set that is based on the key agreement protocol, the first random value, and the unique polynomial function. Generation of these key values $k_i$ may also considers the ideal permutation such that it is effectively removed from consideration. Stated differently, $k_i = KA.key_1(a, \Pi(p(s_i)))$.

In one example, the first party may generate first information regarding the first key set comprising the key values $k_i$. In one example, the first information may include a shuffle of the first key values K, where $K = \{k_1, \ldots, k_n\}$. Use of a shuffled set in this manner may disturb any order of the instances of the first set that may be established within the set. In turn, the first party sends the first key values K to a third party Q that wishes to determine a private set intersection between the first set of the first party and the second set of the second party. By providing the first key values K to the third party Q, the first party effectively provides first information regarding the instances of the first set in the form of the key set to the third party for use in determining the private set intersection, although the first key values of the key set do not provide information regarding the individual instances of the set unless the instance intersects the second set based on the further protocol steps discussed below.

As will be described in greater detail below, the first party may provide first information regarding the first key set in an alternative manner. For example, the first party may generate a first polynomial function that interpolates the key values of the key set. One example using this approach is described in greater detail below in another example of a PSI protocol. However, it should be understood that use of a first polynomial function as the first information may also be used in the present example without limitation.

The second party computes a second unique polynomial function q. The second unique polynomial function q is of a degree less than or equal to one fewer degree than the number of instances in the sets (e.g., q is of degree $\leq n-1$). The second unique polynomial function q may encode information regarding the second set through the use of second key values generated from the key agreement protocol. That is, the second unique polynomial function q may interpolate the second key values of a second key set generated by the second party. Specifically, for each instance of the second set as an input to the second unique polynomial, the result is equal to a key value generated using the second random value and the first message or $q(t_i) = KA.key_2(b_i, m)$ for all $i \in [n]$. The second party sends the second unique polynomial q to the third party Q.

In this regard, the third party (Q) may have first information and second information. The first information and the second information may comprise encoded values of the respective key sets of the parties that may be generated using a cryptographic transformation based on the key agreement protocol. That is, the first information may include information regarding the first key set in the form of the first key values K, and the third party Q may have encoded information regarding the second key set in the form of the second unique polynomial q. As such, the third party Q may use the protocol in view of the information received to perform the private set intersection. Specifically, the third party Q may equate the second unique polynomial with the first key values K to determine solutions for the equation. Any solutions to the equation generated by the third party Q correspond to intersections of the first set and the second set.

If the instances of the first set and second set do not intersect, no solution is provided. Stated mathematically, for each $i \in [n]$, the third party Q computes all solutions t to the equation $q(T)=k_i$ With the solutions belonging to the intersection of the set $t \in S$, and outputs the solutions $\{t \in S:q(t)=k_i$ for some i}.

It can be proven that this protocol securely computes the intersection of the two sets held by a first party and a second party. Furthermore, execution of the protocol by the first party and the second party may involve only three main types of operations, namely key exchange, polynomial interpolation, and polynomial evaluation. In addition, the execution of the protocol by the third party may involve well understood mathematical operations. Therefore, it is relatively easy to implement, as the best-known algorithms for performing the operations of polynomial interpolation and evaluation are, up to logarithm factors, linear in the number of instances of the set n. This means that the protocol may be applied to large datasets even when the first party and the second party have limited computational power.

As noted above, in another example of a PSI scheme, the first party and the second party may initially hash their elements into a plurality of buckets. In addition, dummy elements selected from a finite field may also be hashed into the plurality of buckets to provide a sufficient number of elements in each bucket to preclude an adversary from obtaining information regarding the set. A PSI protocol may be performed iteratively across all of the plurality of buckets of each party. As each bucket of the respective parties includes a subset of the elements of the parties' respective sets, the computational overhead required to solve for common values within each of the respective buckets may be reduced as compared to performing a solution in relation to the entirety of each party's set. In this regard, while a key agreement protocol may be performed separately for each bucket of the parties, the solution by the third party Q with respect to each bucket pair of the parties may be less computationally complex. For very large data sets (e.g., where n is very large), the use of buckets as described in the following example may reduce the computational overhead requirement by the third party Q.

In this approach, the PSI protocol discussed above may be modified to accommodate the hashing of elements of each party's set into buckets. Specifically, supposing a first party $P_1$ and a second party $P_2$ have respective sets $S_1=\{s_1, \ldots, s_n\} \subseteq \{0,1\}^\ell$ and $S_2=\{t_1, \ldots, t_n\} \subseteq \{0,1\}^\ell$. That is, like the protocol described above, the respective sets may be subsets of a finite field of a given size defined by a parameter $\ell$. That is, $(S_1, S_2 \subseteq \{0,1\}^\ell)$. The size of the field may be defined in relation to the field parameter $\ell$. The respective sets of each party are of size n. This approach may include identifying $\{0,1\}^\ell$ as a subset of $\{0,1\}^\kappa$ for some $\kappa > \ell$. That is, the respective sets of the parties having a size based on the field parameter $\ell$ may be subsets of a larger finite field based on a size defined by an expanded field parameter $\kappa$. The expanded field may be sufficiently large (e.g., $\kappa$ may be sufficiently large) to provide a sufficient number of random dummy elements to hash into the buckets of each party. In some examples, $\kappa = \ell+1$, which may provide a sufficiently large expanded field from which the elements may be provided to avoid false positives of common values in the respective sets.

Turning to the hashing of elements into buckets, a hashing algorithm may be used. Specifically, if h is a positive integer, [h] may denote the set $\{1, 2, \ldots, h\}$. In addition, the number of buckets b to be used in the protocol may be determined. A hash function H may also be defined. Specifically, the hash function may be described as H: $\{0,1\}^\kappa \rightarrow [b]$. That is, the hash function H may hash values from the expanded field (of which the respective sets are a subset) into the buckets. The hash function H may correspond to an ideal hash function. A check parameter $\mu$ may be provided such that $0 < \mu < 1$. The check parameter $\mu$ may be set such that the probability that any bucket contains more than $(1+\mu)n/b$ elements or less than $(1-\mu)n/b$ elements of $S_1$ or $S_2$ is negligible in $\lambda$, where $\lambda > 0$. As such, like above, $\lambda$ may be a correctness and security parameter.

As discussed below, the parties may abort the protocol if any bucket contains more than an upper threshold number of elements from the set or less than a lower threshold number of elements from the set, with the upper threshold number and lower threshold number being based on the check parameter. The upper and/or lower threshold may be generated based on the check parameter. In addition, the number of elements in a set n and/or the number of buckets b may be used to determine the thresholds. In one example, the upper threshold number of elements may be $(1+\mu)n/b$ elements or and the lower threshold number of elements may be $(1-\mu)n/b$ elements of $S_1$ or $S_2$. That is, the value for the check parameter $\mu$ may be chosen so that the probability of abort is negligible. In one example, the value of the check parameter $\mu$ may be based on the security parameter $\lambda$, the number of buckets b, and/or the number of elements in the sets n. For example, one suitable value for the check parameter may be $$\mu = \sqrt{\frac{3b}{n}(\lambda + \ln 2b)}.$$

Furthering the example protocol, one may assume that, for each bucket instance j for the set of buckets b (e.g., $j \in [b]$), there may be at least $[4\mu n/b]+4$ elements of $\{0,1\}^\kappa \backslash \{0,1\}^\ell$ that hash to the j-th bucket. That is, a sufficient number of dummy elements may be provided in each j-th bucket. In turn, any two disjoint subsets $R_{1,j}$, $R_{2,j} \subseteq \{0,1\}^\kappa \backslash \{0,1\}^\ell$ may be fixed, each of size $\lceil 2\mu n/b \rceil + 2$, such that respective elements of the first party and the second party (e.g., $R_{1,j}$ and $R_{2,j}$) are both mapped to the j-th bucket under the hash function H.

The protocol may also include fixing some factor $\delta > 0$ and letting $\lambda'=\max(\lambda, n^\delta)$. In this case, $\lambda'$ may be an expanded security parameter used to define the size of the finite field from which the subsets and dummy elements belong. In this case, the expanded security parameter may be relatively larger than the approach described above in which bucketing is not used. The expanded field based on the expanded security parameter may accommodate selection of dummy elements from the finite field with sufficient size such that the likelihood of common dummy elements in the buckets is negligible. For example, an expanded field may be identified as $\{0,1\}^\kappa$ with a subset S of a finite field $\mathbb{F}$ with $|\mathbb{F}| \geq 2^{\kappa+\lambda'+2 \log n}$.

A key agreement protocol may be selected for the PSI protocol. For example, a two-round key agreement protocol KA may be selected that has a space of randomness $KA.\mathcal{R}$, a message space $KA.\mathcal{M} = \mathbb{F}$, and a key space $KA.\mathcal{K} = \mathbb{F}$. Also, ideal permutations may be fixed, where the permutations are bijective functions on the field $\mathbb{F}$. The ideal permutations ($\Pi_i$) may be permutations chosen randomly from all available permutations such that $\Pi_1, \ldots, \Pi_b$: $\mathbb{F} \rightarrow \mathbb{F}$. In an example, the key agreement protocol KA may be as described above in relation to the protocol presented above.

In choosing the value for the expanded field, $\kappa$ may be determined such that, there are at least $\lceil 4\mu n/b \rceil + 4$ elements of $\{0,1\}^\kappa \backslash \{0,1\}^\ell$ that hashes to the j-th bucket for each $j \in [b]$. For sufficiently large n, $\kappa = \ell + 1$ will work with high probability.

The first party $P_1$ and the second party $P_2$ may use the hash function H to hash their elements (along with a sufficient number of dummy elements from the expanded field) into b buckets. Specifically, let $s_{i,j} = |\{s \in S_i : H(s) = j\}|$ be the size of the j-th bucket for a given party $P_i$. As noted above, the parties may check the number of elements in each bucket relative to the upper threshold and the lower threshold based on the check parameter. Specifically, either party may abort if $s_{i,j} > (1+\mu)n/b$ or $s_{i,j} < (1-\mu)n/b$ for some i, j.

The protocol may be iteratively performed for each of the j buckets b. That is, for each of the buckets, let $M = [(1+\mu) n/b]$. A party $P_i$ chooses a subset $R'_{i,j} \subseteq R_{i,j}$ of size $M - s_{i,j}$ and defines $S_{i,j} = \{s \in S_i : H(s) = j\} \cup R'_{i,j}$. In turn, the respective bucket elements may be $S_{1,j} = \{s_{j,1}, \ldots, s_{j,M}\}$ for the first party and $S_{2,j} = \{t_{j,1}, \ldots, t_{j,M}\}$ for the second party.

In choosing the number of buckets b, considerations may be provided to both communication costs and computational costs. For example, the greater the number of buckets, the more times the key agreement protocol must be performed between the first party and the second party, thus increasing the communication cost. However, the greater the number of buckets, the lower the computational demand on the third party Q. In turn, for the value of the number of buckets, a sizing parameter $\alpha$ may be used. Specifically, $\alpha$ may be $0 < \alpha < 1$. The number of buckets may be defined as $b = \lceil n^\alpha \rceil$. Such a choice of b allows achieving a low computational cost.

The first party $P_1$ picks a random value for the present iteration from a space of randomness ($a_j \leftarrow KA.\mathcal{R}$). In turn, the first party $P_1$ sends a message $m_j = KA.msg_1(a_j)$ to the second party $P_2$.

For each bucket element of the second party $P_2$ ($i \in [M]$) for the given instance j, which may include elements of the set as well as dummy elements, $P_2$ picks a random value from the space of randomness $b_{j,i} \leftarrow KA.\mathcal{R}$. In turn, the second party $P_2$ generates a response message for each bucket element letting $m_{j,i}' = KA.msg_2(b_{j,i}, m_j)$. A permutation function may be defined for each element as $$f_{j,i} = \Pi_j^{-1}(m'_{j,i}).$$

The second party $P_2$ computes a unique polynomial $p_j$ of degree$\leq M-1$ such that $p_j(t_{j,i}) = f_{j,i}$ for all $i \in [M]$, and sends $p_j$ to $P_1$. That is, the unique polynomial $p_j$ may interpolate the response message generated for each bucket element.

The first party $P_1$ may for each of its bucket elements of the present iteration compute a key value based on the response messages of the second party $P_2$. Stated differently, for each $i \in [M]$, $P_1$ computes $k_{j,i} = KA.key_1(a_j, \Pi_j(p_j(s_{j,i})))$.

The first party $P_1$ may generate first information regarding the first key set of the computed key values. As noted above, in one example, the first information may comprise a first polynomial function that interpolates the first key values. To this end, the first party $P_1$ may select a random value from the key space $k'_j \leftarrow KA.\mathcal{K}$ and compute a first polynomial function $r_j$ of degree$\leq M$ such that $r_j(u) = k'_j$ and $r_j(s_{j,i}) = k_{j,i}$ for all $i \in [M]$. In turn, the first party may send the first polynomial function $r_j$ to a third party Q.

The second party $P_2$ may generate second information regarding the second key values of the second party. This second information may be a second polynomial function that interpolates the second key values. To this end, the second party $P_2$ may select a random value from the key space $k''_j \leftarrow KA.\mathcal{K}$ and computes the second polynomial function $q_j$ of degree$\leq M$ such that $q_j(u) = k''_j$ and $q_j(t_{j,i}) = KA.key_2(b_{j,i}, m_j)$ for all $i \in [M]$. In turn, the second party $P_2$ sends the second polynomial function $q_j$ to the third party Q.

As noted above, when generating first information and second information in the form of polynomial functions, $P_1$ and $P_2$ may choose a random element in the key space KA.$\mathcal{K}$ and interpolate a polynomial such that the polynomial has this chosen value at some fixed point u. However, instead of choosing the unique polynomials of degree$\leq M-1$ satisfying their respective constraints, the first party $P_1$ and the second party $P_2$ may choose random polynomials of degree$\leq M$ that satisfy the constraints. This additional degree of freedom of the unique polynomials may provide consideration for an example scenario in which the first set and the second set are identical (e.g., $S_1 = S_2$). That is, if the polynomials are of the degree$\leq M-1$, and the first set is identical to the second set, the polynomials q and r will be identical, and hence Q will be unable to determine the intersection. However, by providing the polynomials with an additional degree of freedom (e.g., $\leq M$), solutions may be determined by the third party Q even in the scenario in which the first set and the second set are identical.

The third party Q may establish an equation based on the first information and the second information. For example, the third party Q may utilize the equation $q_j(T) - r_j(T) = 0$ with $t \in S$ and define $I_j = \{t \in S : q_j(t) - r_j(t) = 0\}$. In turn, the third party Q may utilize the first information and the second information to solve for t, where t represents the intersection of the first set and the second set.

As noted above, this process may be iterated over all instances j of the set of buckets b. As such, upon completion of the solutions for each instance j of the buckets b, the third party Q may output the solutions for each equation $$\bigcup_{j=1}^b I_j.$$

As such, all intersections of the first set and the second set may be output. In this regard, this protocol generally corresponds to running a modified version of the PSI protocol described above a total of b times, once on each bucket.

In this example protocol, the computational complexity may be described as $O(n^{1+\epsilon})$ where $\epsilon$ can be any positive real number. This may improve the computational complexity of this second example of a third-party PSI scheme. For example, the third-party PSI scheme described above (e.g., without bucketing) may have a computational complexity of $O(n^4)$.

In some aspects, the techniques described herein relate to a method for determining a private set intersection of respective sets of a first party and a second party by a third party, including: receiving, at the third party, first information regarding a first key set generated by the first party using a key agreement protocol between the first party and the second party, the first key set including encoded keys for elements of a first set of the first party; receiving, at the third party, second information regarding a second key set generated by the second party using the key agreement protocol between the first party and the second party, the second key set including encoded keys for elements of a second set of the second party; and calculating, at the third party, solutions to an equation based on the first information and the second information, the solutions to the equation correspond to common elements of the respective sets of the first party and the second party, wherein the third party obtains no other information regarding the first set or the second set, and wherein the first party and the second party do not obtain information regarding the common elements of the respective sets during the determining the private set intersection by the third party or any information regarding the elements of a set of another participating party during the determining the private set intersection.

In some aspects, the techniques described herein relate to a method, wherein the first information includes a random shuffle of the first key set of the first party and the second information includes a polynomial function that interpolates the second key set of the second party, and wherein the calculating includes determining all solutions to the equation that equates the polynomial function to the random shuffle of the first key set.

In some aspects, the techniques described herein relate to a method, wherein the first information includes a first polynomial function that interpolates the first key set of the first party and the second information includes a second polynomial function that interpolates the second key set of the first party, and wherein the calculating includes determining all solutions to the equation that the first polynomial function subtracted from the second polynomial function equals zero.

In some aspects, the techniques described herein relate to a method, further including: receiving a first plurality of first communications from the first party, each of the first plurality of first communications including information regarding a subset of elements of the first set and one or more dummy elements, the first plurality of first communications collectively including the first information regarding an entirety of the first set; receiving a second plurality of second communications from the second party, each of the second plurality of second communications including information regarding a subset of elements of the second set and one or more dummy elements, the second plurality of second communications collectively including the second information regarding an entirety of the second set; and calculating solutions to a plurality of equations each based on respective ones of the first plurality of first communications and the second plurality of second communications, wherein the calculating iterates over the first plurality of communications and the second plurality of communications to determine the common elements of the respective sets of the first party and the second party.

In some aspects, the techniques described herein relate to a method, wherein the key agreement protocol includes a two-round key agreement protocol in which: the first party generates a first message based on a random value within a space of randomness that the second party uses, in combination with respective random values from the space of randomness, to generate a plurality of second messages for elements of the second set, the second party computes a unique polynomial function that interpolates the second messages, the unique polynomial function being sent to the first party, the first party generates the first information based on the unique polynomial function, and the second information is based on the plurality of second messages.

In some aspects, the techniques described herein relate to a method, wherein computational complexity of the determining the private set intersection of respective sets of the first party and the second party by the third party approaches linearity.

In some aspects, the techniques described herein relate to a method for providing a communication to a third party for use in determining a private set intersection between respective sets of a first party and a second party, including: generating, at a first party having a first set, a first message using a key agreement protocol based on a first random value selected from a space of randomness; sending the first message to a second party having a second set; receiving, at the first party from the second party, a unique polynomial function that interpolates a plurality of second messages generated for elements of the second set by the second party based on the first message and respective second random values from the space of randomness; computing first information regarding a first key set generated by the first party using the unique polynomial function, the first key set including encoded keys for elements of the first set of the first party; and sending the first information to the third party.

In some aspects, the techniques described herein relate to a method, wherein the first information includes a random shuffle of the first key set of the first party.

In some aspects, the techniques described herein relate to a method, wherein the first information includes a first polynomial function that interpolates the first key set of the first party.

In some aspects, the techniques described herein relate to a method, further including: distributing the elements of the first set into a plurality of buckets; computing the first information for each of the plurality of buckets, wherein the key agreement protocol is used by the first party and the second party relative to each of the plurality of buckets to compute the first information for each of the plurality of buckets; and sending the first information for each of the plurality of buckets to the third party.

In some aspects, the techniques described herein relate to a method, wherein the distributing includes applying a hash function to the elements to hash the elements of the first set into the plurality of buckets.

In some aspects, the techniques described herein relate to a method, further including: determining whether any of the plurality of buckets contain more than an upper threshold number of elements of the first set or less than a lower threshold number of elements of the first set.

In some aspects, the techniques described herein relate to a method, wherein the upper threshold number of elements and the lower threshold number of elements are based on a distribution parameter based on a security parameter and a number of elements in the first set.

In some aspects, the techniques described herein relate to a method, wherein the space of randomness for the key agreement protocol is based on a security parameter.

In some aspects, the techniques described herein relate to a method for providing a communication to a third party for use in determining a private set intersection between respective sets of a first party and a second party, including: receiving, at a second party having a second set from a first party having a first set, a first message generated by the first party using a key agreement protocol based on a first random value from a space of randomness; determining, for elements of the second set, respective second messages based on corresponding second random values from the space of randomness and the first message; computing a first unique polynomial function that interpolates the second messages; sending the unique polynomial function to the first party for use in generating first information regarding a key set of the first party; generating second information regarding a second key set at the second party, the second key set including encoded keys for elements of the second set; and sending the second information to the third party.

In some aspects, the techniques described herein relate to a method, wherein the second information includes a polynomial function that interpolates the second key set of the second party.

In some aspects, the techniques described herein relate to a method, further including: distributing the elements of the second set into a plurality of buckets; computing the second information for each of the plurality of buckets, wherein the key agreement protocol is used by the first party and the second party relative to each of the plurality of buckets to compute the second information for each of the plurality of buckets; and sending the second information for each of the plurality of buckets to the third party.

In some aspects, the techniques described herein relate to a method, wherein the distributing includes applying a hash function to the elements to hash the elements of the first set into the plurality of buckets.

In some aspects, the techniques described herein relate to a method, further including: determining whether any of the plurality of buckets contain more than an upper threshold number of elements of the second set or less than a lower threshold number of elements of the second set.

In some aspects, the techniques described herein relate to a method, wherein the upper threshold number of elements and the lower threshold number of elements are based on a distribution parameter based on a security parameter and a number of elements in the second set.

In some aspects, the techniques described herein relate to a method, wherein the space of randomness for the key agreement protocol is based on a security parameter.

While this specification contains many specific implementation details, these should not be construed as limitations on the scope of any technologies or of what may be claimed but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a sub-combination or variation of a sub-combination.

Similarly, while operations are described in a particular order, this should not be understood as requiring that such operations be performed in the particular order described or in sequential order or that all operations be performed to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together into a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes described do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A method for determining a private set intersection of respective sets of a first party and a second party by a third party, comprising:

receiving, at the third party, first information regarding a first key set generated by the first party using a key agreement protocol between the first party and the second party, the first key set comprising encoded keys for elements of a first set of the first party;

receiving, at the third party, second information regarding a second key set generated by the second party using the key agreement protocol between the first party and the second party, the second key set comprising encoded keys for elements of a second set of the second party; and calculating, at the third party, solutions to an equation based on the first information and the second information, the solutions to the equation correspond to common elements of the respective sets of the first party and the second party, wherein the third party obtains no other information regarding the first set or the second set, and wherein the first party and the second party do not obtain information regarding the common elements of the respective sets during the determining the private set intersection by the third party or any information regarding the elements of a set of another participating party during the determining the private set intersection.

2. The method of claim 1, wherein the first information comprises a random shuffle of the first key set of the first party and the second information comprises a polynomial function that interpolates the second key set of the second party, and wherein the calculating comprises determining all solutions to the equation that equates the polynomial function to the random shuffle of the first key set.

3. The method of claim 1, wherein the first information comprises a first polynomial function that interpolates the first key set of the first party and the second information comprises a second polynomial function that interpolates the second key set of the first party, and wherein the calculating comprises determining all solutions to the equation that the first polynomial function subtracted from the second polynomial function equals zero.

4. The method of claim 1, further comprising:

receiving a first plurality of first communications from the first party, each of the first plurality of first communications comprising information regarding a subset of elements of the first set and one or more dummy elements, the first plurality of first communications collectively comprising the first information regarding an entirety of the first set;

receiving a second plurality of second communications from the second party, each of the second plurality of second communications comprising information regarding a subset of elements of the second set and one or more dummy elements, the second plurality of second communications collectively comprising the second information regarding an entirety of the second set; and calculating solutions to a plurality of equations each based on respective ones of the first plurality of first communications and the second plurality of second communications, wherein the calculating iterates over the first plurality of communications and the second plurality of communications to determine the common elements of the respective sets of the first party and the second party.

5. The method of claim 1, wherein the key agreement protocol comprises a two-round key agreement protocol in which:

the first party generates a first message based on a random value within a space of randomness that the second party uses, in combination with respective random values from the space of randomness, to generate a plurality of second messages for elements of the second set, the second party computes a unique polynomial function that interpolates the second messages, the unique polynomial function being sent to the first party, the first party generates the first information based on the unique polynomial function, and the second information is based on the plurality of second messages.

6. The method of claim 1, wherein computational complexity of the determining the private set intersection of respective sets of the first party and the second party by the third party approaches linearity.

7. The method of claim 1, wherein the first information is received at the third party for each of a plurality of first buckets of the first party, the plurality of first buckets comprising a distribution of the elements of the first set into the plurality of buckets.

8. The method of claim 7, wherein the first information is computed for each of the plurality of first buckets, wherein the key agreement protocol is used by the first party and the second party relative to each of the plurality of first buckets to compute the first information for each of the plurality of first buckets.

9. The method of claim 7, wherein the distributing comprises applying a hash function to the elements of the first party to hash the elements of the first set into the plurality of first buckets.

10. The method of claim 7, wherein the plurality of first buckets contain no more than an upper threshold number of elements of the first set and no less than a lower threshold number of elements of the first set.

11. The method of claim 10, wherein the upper threshold number of elements and the lower threshold number of elements are based on a distribution parameter based on a security parameter and a number of elements in the first set.

12. The method of claim 1, wherein the second information is received at the third party for each of a plurality of second buckets of the second party, the plurality of second buckets comprising a distribution of the elements of the second set into the plurality of second buckets.

13. The method of claim 12, wherein the second information is received at the second party for each of a plurality of second buckets of the second party, wherein the key agreement protocol is used by the first party and the second party relative to each of the plurality of second buckets to compute the second information for each of the plurality of second buckets.

14. The method of claim 13, wherein the distributing comprises applying a hash function to the elements of the first party to hash the elements of the second set into the plurality of second buckets.

15. The method of claim 13, wherein the plurality of second buckets contain no more than an upper threshold number of elements of the second set and no less than a lower threshold number of elements of the second set.

16. The method of claim 15, wherein the upper threshold number of elements and the lower threshold number of elements are based on a distribution parameter based on a security parameter and a number of elements in the second set.

17. The method of claim 1, wherein communication between the first party and the second party is not greater than three times a number of elements in a given party's set.

18. The method of claim 1, wherein the equation based on the first information and the second information is of a degree less than a number of elements in the first set or the second set.

* * * * *